Jan. 24, 1956                    W. L. RICE                    2,732,113
                    TOBACCO WEIGHING AND PACKING APPARATUS
Filed Oct. 1, 1952                                        8 Sheets-Sheet 2

INVENTOR
WILLIAM L. RICE
BY Stone, Boyden & Mack,
ATTORNEYS

Jan. 24, 1956 W. L. RICE 2,732,113
TOBACCO WEIGHING AND PACKING APPARATUS
Filed Oct. 1, 1952 8 Sheets-Sheet 5

INVENTOR
WILLIAM L. RICE

BY Stone, Boyden & Mack,

ATTORNEYS.

Jan. 24, 1956 W. L. RICE 2,732,113
TOBACCO WEIGHING AND PACKING APPARATUS
Filed Oct. 1, 1952 8 Sheets-Sheet 7
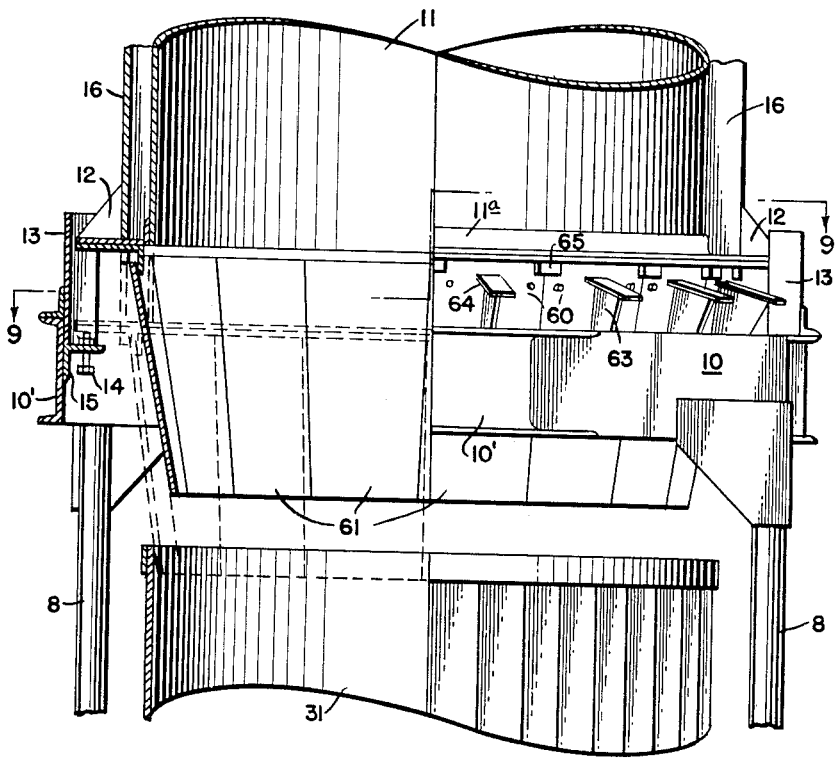
Fig.10.
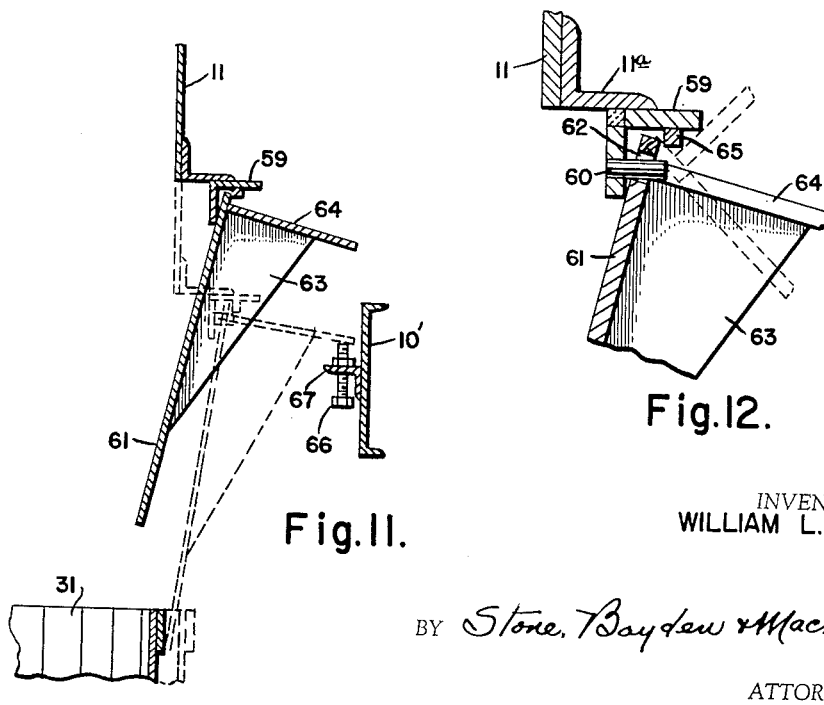
Fig.11.
Fig.12.
INVENTOR
WILLIAM L. RICE
BY Stone, Boyden & Mack,
ATTORNEYS Jan. 24, 1956  W. L. RICE  2,732,113
TOBACCO WEIGHING AND PACKING APPARATUS
Filed Oct. 1, 1952  8 Sheets-Sheet 8

INVENTOR
WILLIAM L. RICE

BY Stone, Boyden & Mack
ATTORNEYS.

United States Patent Office 2,732,113
Patented Jan. 24, 1956

2,732,113

TOBACCO WEIGHING AND PACKING APPARATUS

William L. Rice, Asheville, N. C.

Application October 1, 1952, Serial No. 312,469

15 Claims. (Cl. 226—71)

This invention relates to apparatus for weighing and packaging loose fibrous material, and more particularly for weighing and packing tobacco in hogsheads.

The invention contemplates feeding the tobacco into the hogshead by means of a rotary distributer such as shown in Patent No. 2,596,018, issued May 6, 1952, to F. B. Fishburne et al. In this patent, however, it was proposed to fill the hogshead while in one location, and then move it to another location for pressing or packing. As distinguished from this, the present invention has for one object the filling and pressing of the hogshead at the same location.

Another object is to provide means by which a hogshead may be filled and packed to a predetermined weight. To this end, the invention contemplates the provision of a suitable platform scale on which the weight of the hogshead, charger and contents rest during the filling operation, together with means for supporting this weight and sustaining the thrust of the press independently of the scale platform during the pressing operation.

Conventional hogsheads, not being accurately constructed, often vary in diameter by as much as an inch or two, and frequently they are "out of round" and also do not stand vertically. Owing to these circumstances, it has proven very difficult to provide a satisfactory connection between the bottom of the charger and the top of the hogshead. Although substantially rigid when in use, the upper portion of conventional hogsheads may be moved laterally or deformed by the application of sufficient force to the open end thereof.

A further object of the invention is therefore to provide an improved construction of charger, equipped at its lower end with a tapering funnel portion adapted to enter the upper end of the hogshead to straighten up the same and hold it round, as well as to center and align it with respect to the charger. A still further feature consists in making such tapering funnel portion expansible so that it will effectively true up the upper end of the hogshead and may also expand the same if necessary.

In using long and heavy chargers such as have now been proposed, it is found that there is great danger of the weight of the charger breaking or crushing the hogshead, if, as has been the usual practice heretofore, the charger rests directly on the hogshead. The present invention therefore contemplates supporting the charger in position on the hogshead by means independent of the hogshead.

Notwithstanding this independent support, however, it is necessary to transmit the weight of the charger to the scale during the filling and weighing operation. Yet another object of the invention, therefore, is to devise means for supporting the charger in such manner as to prevent any possibility of the hogshead being crushed, while, at the same time, the weight of the charger and contents, together with that of the hogshead, is imposed upon the scale platform. Means are also provided for supporting the charger independently of the hogshead, by the pressure pad, during the pressing operation.

With the above and other objects in view, the invention consists in the construction and combination of parts hereinafter described and claimed, and illustrated in the accompanying drawings, forming part of this specification, and in which—

Fig. 10 is a fragmentary vertical section substantially on the line 10—10 of Fig. 9, parts being shown in elevation.

Fig. 11 is a fragmentary vertical sectional view showing one of the elements making up the expansible funnel, and its associated parts.

Fig. 12 is a similar fragmentary section on an enlarged scale showing in detail the method of assembling and supporting these elements.

Figure 1:
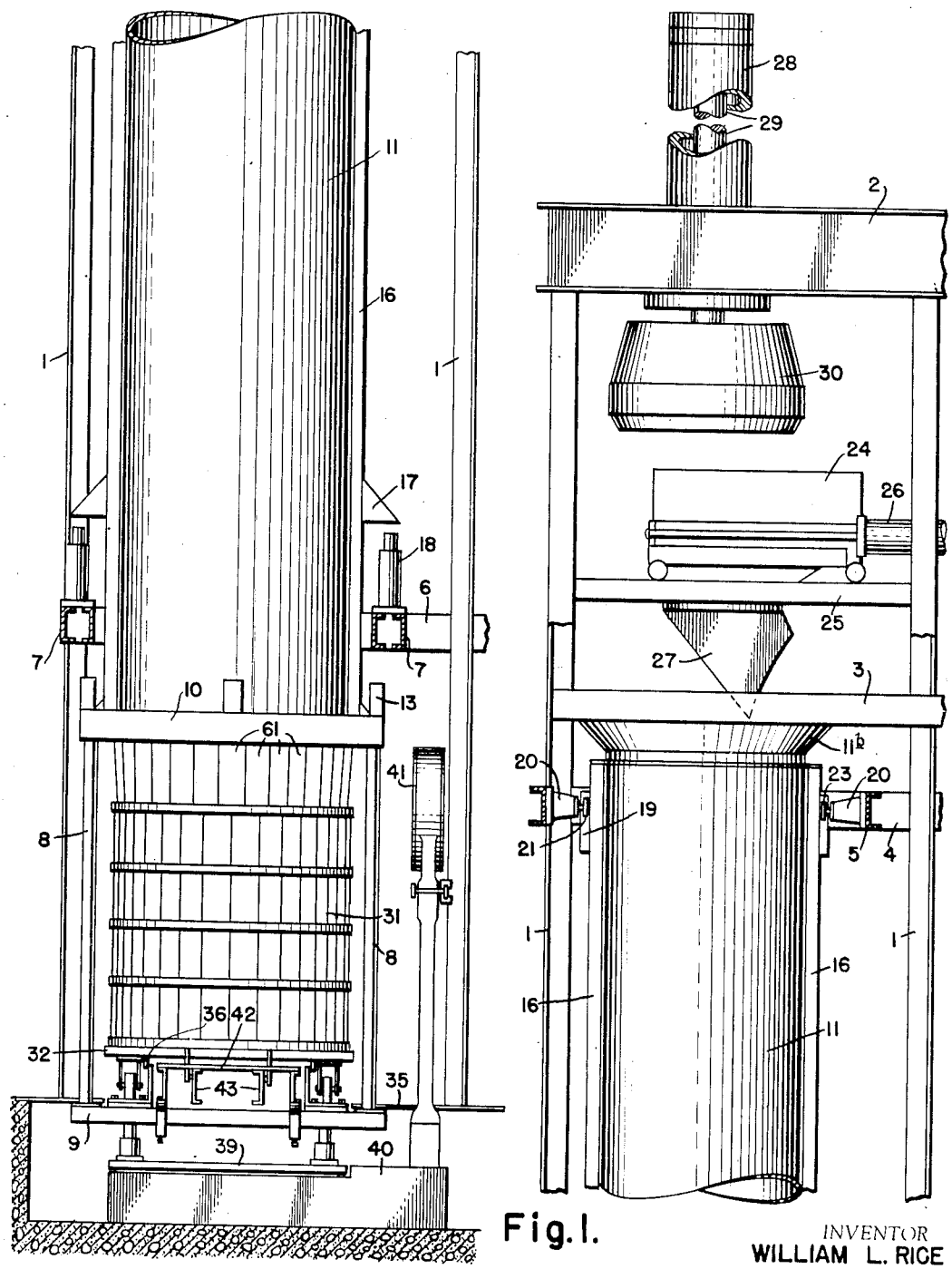
Fig. 1 is a broken side elevation of the complete apparatus, parts being in section.

Referring to the drawings in detail, my improved apparatus comprises a press frame made up of four vertical columns 1 showing as angle irons and supporting horizontal beams or frame members 2, 3, 4, 5, 6 and 7 as clearly illustrated in Figs. 1 to 4, inclusive.

Figure 5:
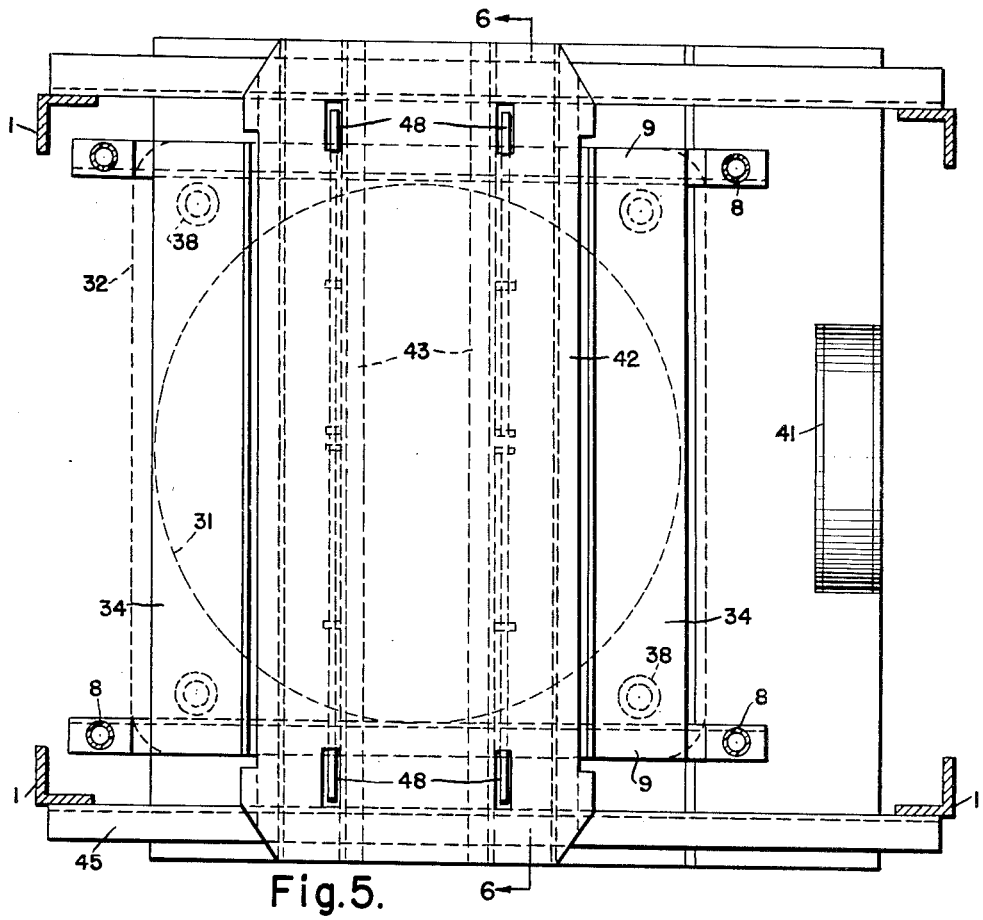
Fig. 5 is a plan view showing the parts illustrated at the bottom of Fig. 2, the hogshead and supporting dolly being shown in dotted lines and the vertical columns being in section.

Inside of this press frame is a smaller rectangular frame comprising four posts or columns 8. These are supported at their lower ends on a pair of tie bars 9 as best shown in Fig. 5, and are connected at their upper ends with horizontal frame members 10, as illustrated in Figs. 9 and 10.

11 designates the charger and it is shown as of the single stroke type, that is to say, the charger is of such length as to be capable of containing sufficient loose tobacco to fill the hogshead to the desired density. In practice such a charger may be as much as 23 feet long or high and is therefore of very substantial weight.

Figure 2:
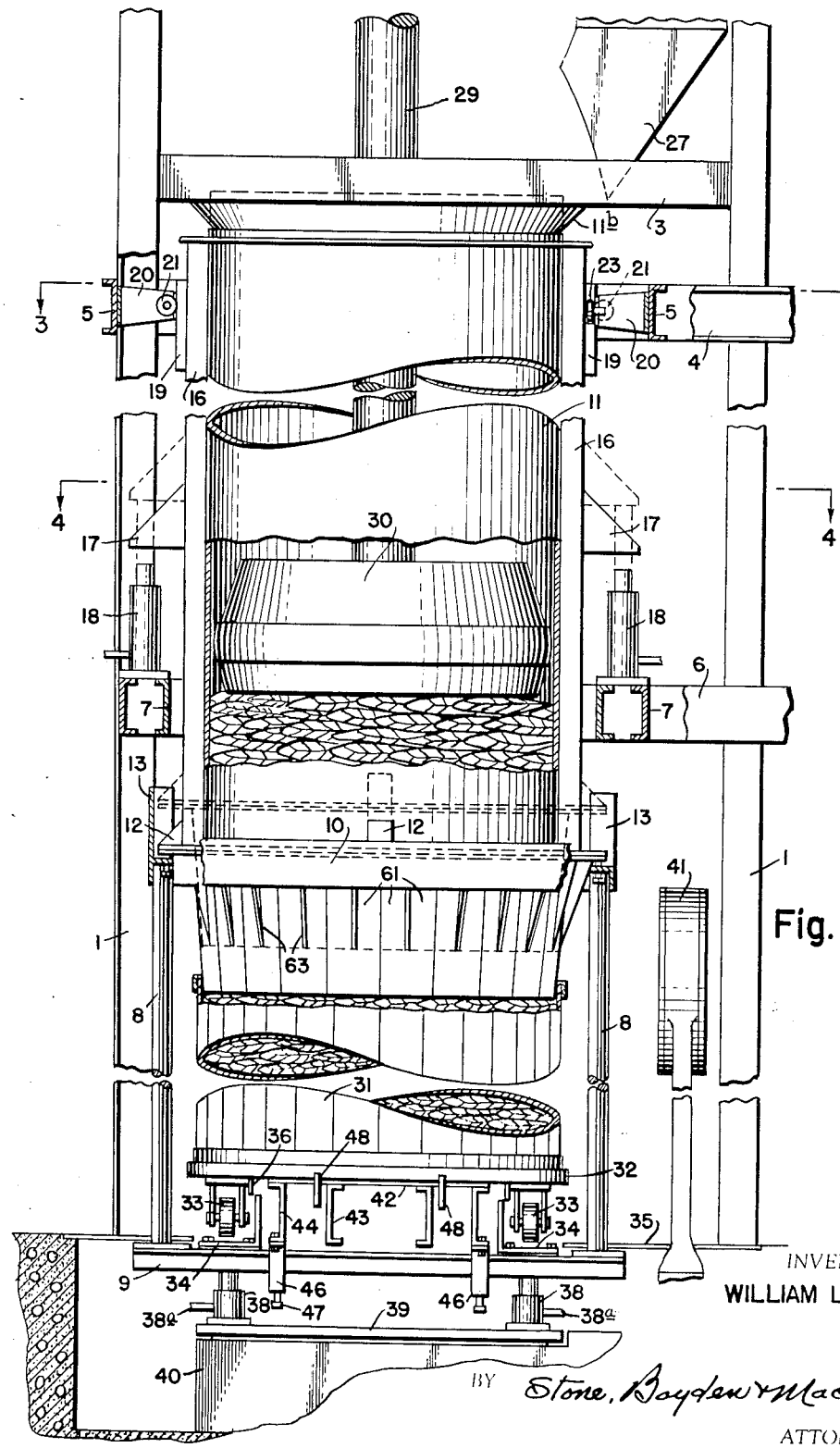
Fig. 2 is a similar view on a larger scale showing the essential parts of the press mechanism.
Figure 3:
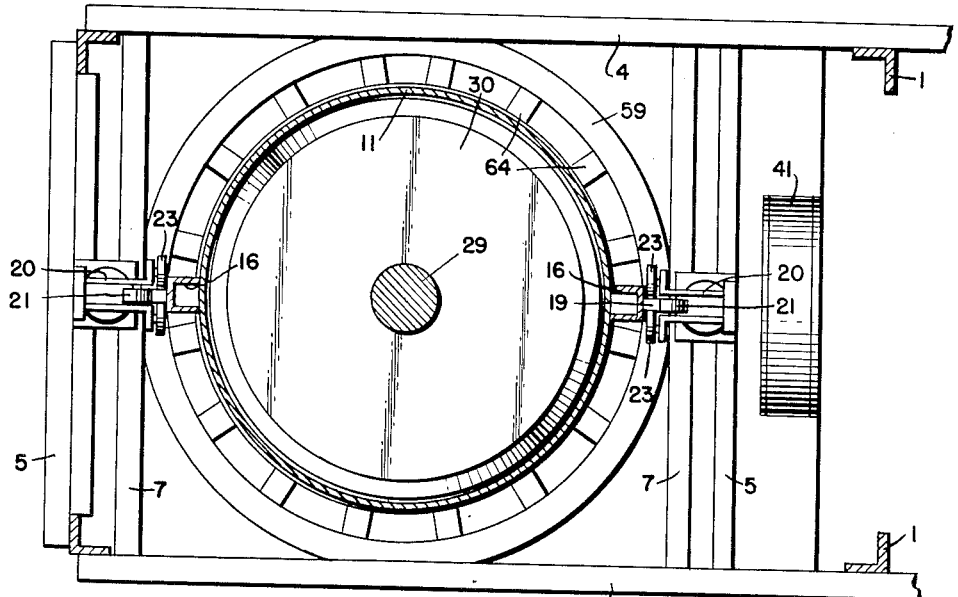
Fig. 3 is a horizontal section substantially on the line 3—3 of Fig. 2.
Figure 4:
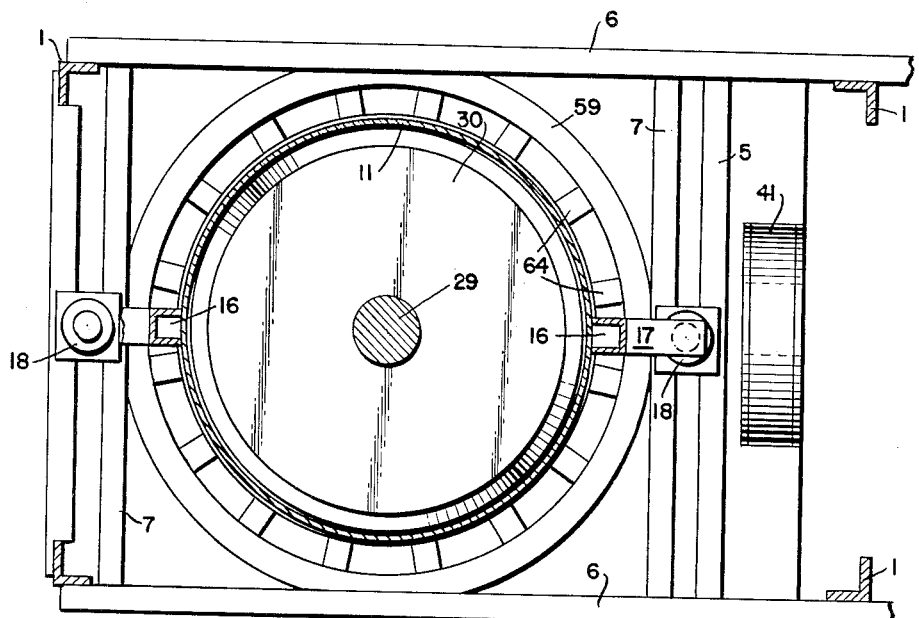
Fig. 4 is a horizontal section substantially on the line 4—4 of Fig. 2.

To the lower end of this charger are secured four outwardly extending brackets 12 which are capable of free vertical movement in guide pockets 13 secured to the frame 10', as clearly shown in Figs. 2 and 10.

Figure 9:
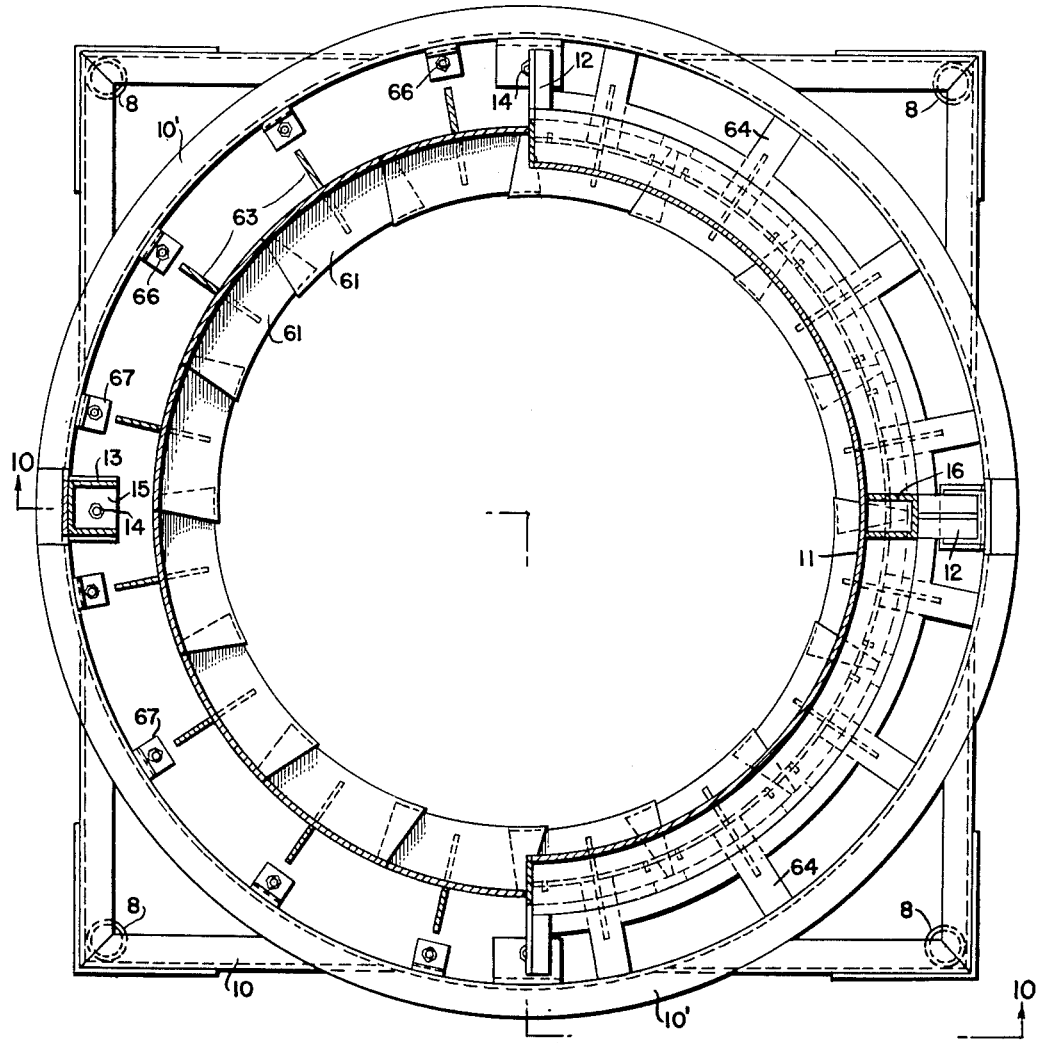
Fig. 9 is a horizontal section on an enlarged scale, substantially on the line 9—9 of Fig. 10, the right and left hand halves of this view lying in different planes.

At the bottom of the guide pockets 13 are brackets 15 through which extend adjustable stop bolts 14 as best shown in Figs. 9 and 10. These adjustable stop bolts are for the purpose of engaging the brackets 12 so as to arrest and limit the downward movement of the charger, as hereinafter described.

The charger is preferably reinforced by a pair of vertically extending ribs 16, disposed at diametrically opposite sides, and to each of these ribs near the bottom of the charger is secured a bracket 17.

Supported on the horizontal frame members 7 immediately beneath the brackets 17 are a pair of hydraulic cylinders 18, having vertically moving plungers which are adapted to engage the brackets 17 and lift the charger.

In order to maintain the charger in true vertical position and to prevent binding or dragging of the same against the frame, I provide anti-friction guiding means near the upper end of the charger as best shown in Figs. 2, 3, 14 and 15. Each of such guiding means comprises a pair of rollers 23 adapted to engage the sides of a rectangular track 19 secured to the charger, and a third roller 21 adapted to engage the outside edge of this track. These rollers are carried by brackets 20 and 22 disposed at right angles to each other and supported by the frame member 5. From this it will be seen that the charger is thus supported and guided in two directions so that its smooth and steady vertical movement is assured.

For feeding the tobacco in the upper end of the charger I preferably employ the rotary distributor arrangements shown in an article by Charles Fishburne appearing on pages 24 and 25 of "Duk Engineer" for December, 1951.

In the present drawings 24 designates a suitable hopper from which depends a rotary spout 27, hopper and spout being supported on a suitable track 25 and moved horizontally by means of a hydraulic piston 26.

The press plunger is shown at 30 and is illustrated as carried by a piston rod 29 working within a vertical hydraulic cylinder 28. In Fig. 1 the hopper and rotary spout are shown in substantially the position which they occupy during the filling operation while in Fig. 2 the rotary spout is indicated as shifted to one side so as to permit the plunger 30 to freely enter the upper end of the charger. The upper end of the charger is preferably provided with a flaring collar 11$^b$.

The hogshead to be packed is indicated at 31 and is supported upon a dolly 32 having wheels or rollers 33. These wheels normally roll upon tracks 34, which are preferably of the angular construction shown in Figs. 2 and 7. They comprise vertical flanges 34$^a$ which cooperate with guide strips 36 carried by the dolly to properly position the wheels on the tracks. These tracks are normally supported at the level of the floor 35 (see Fig. 8) by the plungers 37 of four single acting hydraulic cylinders 38 which rest directly upon the platform 39 of a suitable weighing scale 40, having a dial 41.

Figure 6:
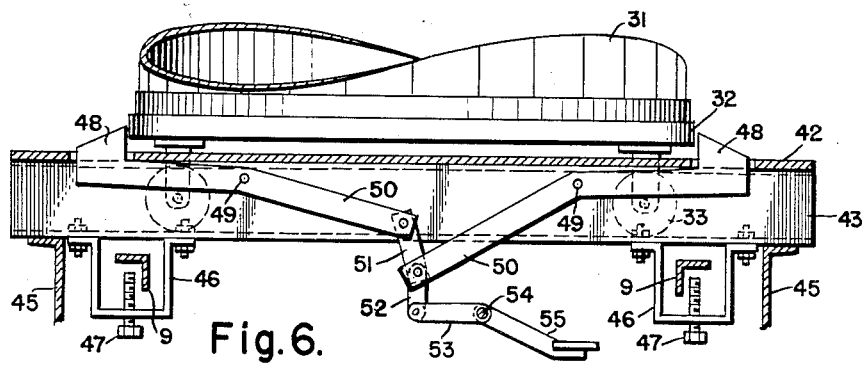
Fig. 6 is a fragmentary vertical section substantially on the line 6—6 of Fig. 5 looking in the direction of the arrows.
Figure 7:
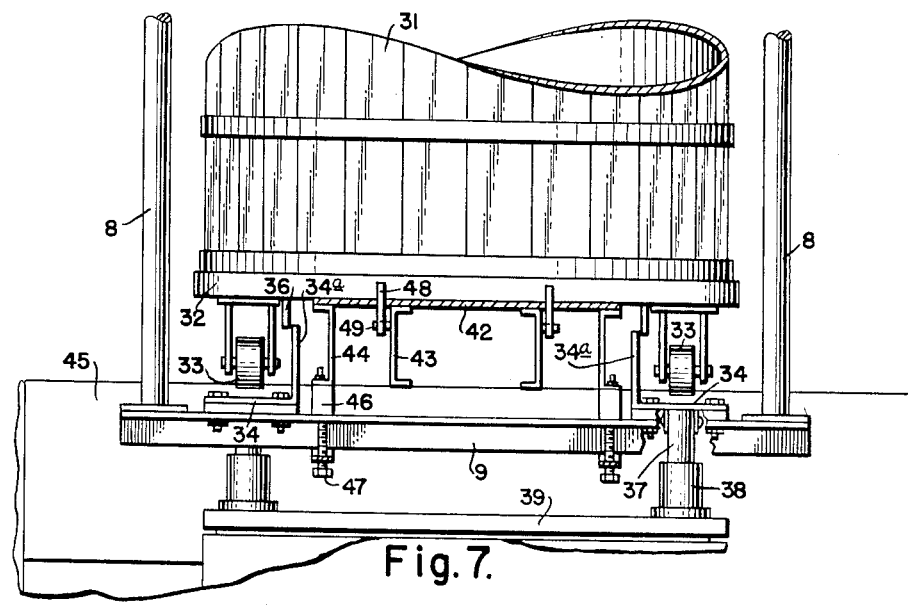
Fig. 7 is a fragmentary side elevation showing the parts illustrated in the lower portion of Fig. 2, but on a larger scale, and with parts broken away.
Figure 8:
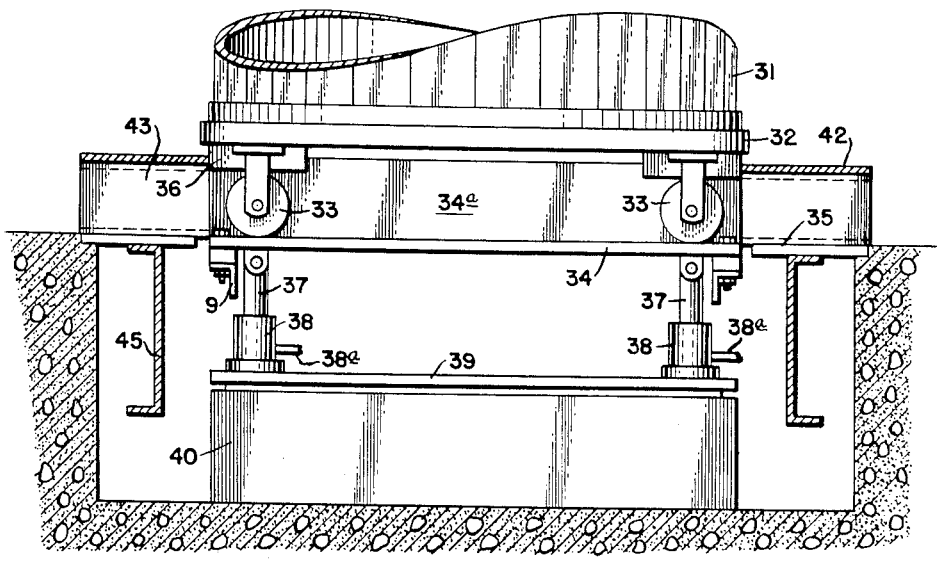
Fig. 8 is a vertical section somewhat similar to Fig. 6, but showing the scale platform and means for supporting the dolly tracks, this view being taken at right angles to that of Fig. 7.

Between the tracks 34 is mounted a pressure pad 42, preferably consisting of a plate supported on channel beams 43, 44 as shown in Figs. 2, 6, 7 and 8. It will be understood that the proportion of the parts are such that when the tracks 34 are elevated into the position shown in Fig. 8, so as to be level with the floor 35, the dolly can roll freely on to the tracks, the wheels 33 being of such height that the floor of the dolly clears the pressure pad. When, however, the tracks are lowered as shown in Figs. 2 and 7, the dolly rests directly upon the pressure pad 42, and the wheels 33 are relieved of the weight of the charger and hogshead. The beams 43 and 44 are carried by main girders 45 as shown in Fig. 8.

Suspended from the beams 43 or 44 of the pressure pad are hangers 46 (see Fig. 6) into which are set adjustable stop screws 47. The tie bars 9 extend through these hangers and are arranged to engage the stop screws 47.

From an inspection of Figs. 5, 7 and 8 it will now be apparent that the tie bars 9 are rigidly secured to the tracks 34, and are thus supported by the plungers 37 of the hydraulic cylinders 38 on which the tracks rest.

Centering latches 48 are preferably provided for properly positioning the dolly 32 over the pressure pad, as shown in Fig. 6. These latch members project up through slots in the plate 42 of the pressure pad and are carried by a pair of arms 50 pivoted at 49 to the beams 43. The inner ends of arms 50 are connected by a link 51 and this in turn connected by a second link 52 with a lever 53 carried by a rock shaft 54, on which is rigidly mounted a pedal 55. It will be obvious that by depresing this pedal the latches 48 may be withdrawn from engagement with the dolly when it is desired to move the same.

Figure 13:
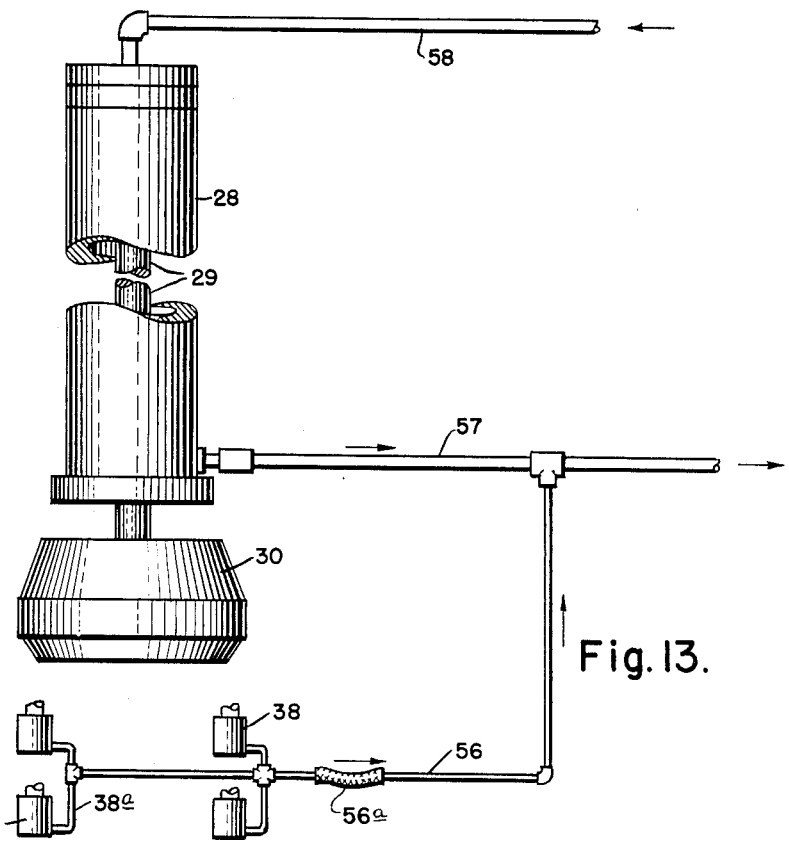
Fig. 13 is a schematic view showing the connection between the main and auxiliary hydraulic cylinders.
Figures 14, 15:
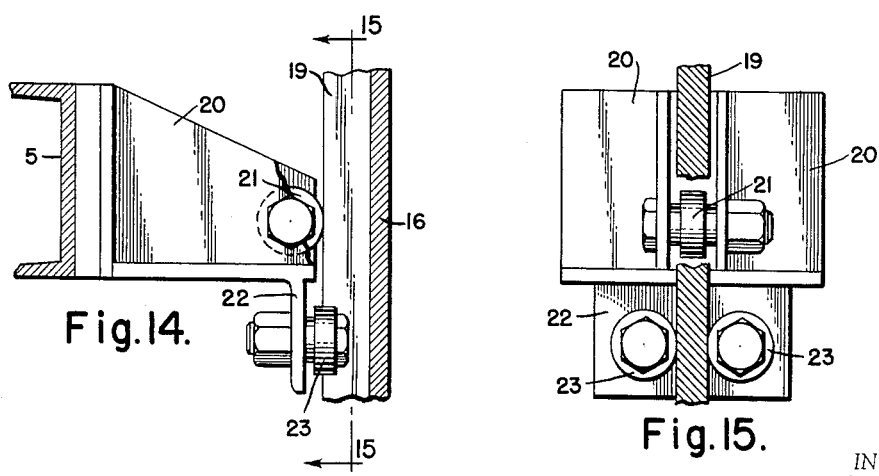
Figs. 14 and 15 are fragmentary details, looking at right angles to each other and showing the anti-friction means for guiding the upper end of the charger as illustrated in Figs. 2 and 3.

Referring now to Fig. 13, I have illustrated the manner in which the auxiliary cylinders 38 are connected with the main cylinder 28. The cylinders 38 are connected by branch pipes 38$^a$ with a pipe 56 which taps the pipe 57 which supplies motive fluid to the lower end of the main cylinder 28. A piece of flexible hose 56$^a$ is inserted in the pipe 56 near the cylinders 38 to allow free movement of the scale platform. A pipe 58 supplies motive fluid to the upper end of the cylinder 28.

It will of course be understood that the pipes 57 and 58 extend to a suitable four-way control valve similar to that shown in Fig. 2 of the patent to Fishburne No. 2,675,154 which is connected with a motor driven pump, by means of which valve motive fluid may be admitted to either end of the cylinder as desired, fluid being exhausted from the other end.

From the foregoing it will be clear that when fluid is being exhausted from the lower end of the cylinder 28 through pipe 57, it will also be exhausted from the cylinders 38 through pipe 56, and the plungers in these cylinders will move downwardly, thus lowering the dolly tracks 34 into the position shown in Figs. 2 and 7, so that the dolly rests upon the pressure pad. This is the pressing position, and while fluid is being exhausted from the pipe 57, it is being supplied through pipe 58 to the upper end of the main cylinder thus forcing the plunger 30 downwardly into the charger. After the press stroke is completed, the control valve is reversed, thus exhausting fluid from the upper end of the main cylinder through pipe 58, and supplying fluid through pipe 57 to the lower end of the cylinder, thereby raising the plunger 30. At the same time, fluid is supplied through pipe 56 to the auxiliary cylinders 38, thus causing them to raise the tracks 34 into the position shown in Figs. 1 and 8, in which position the tracks are supported on the scale platform ready for another weighing operation. The charger is then raised by means of the cylinders 18, and the dolly, carrying the filled hogshead, is rolled away and an empty hogshead placed in position ready to be filled.

It will be particularly noted that, by virtue of the fact that the columns 8 are supported on the tie bars 9 and these tie bars are in turn secured to the tracks 34, the weight of the charger is transmitted through these parts and through the plungers 37 and cylinders 38 to the scale platform 39 during the filling and weighing operation. When the tracks are lowered as shown in Fig. 7, the tie bars 9 also move downwardly until they engage the adjustable stop screws 47 (see Fig. 6) carried by the hangers 46 attached to the beam 43 of the pressure pad. Thus when the tracks are lowered so that the dolly rests upon the pressure pad the weight of the charger is also transferred from the scale platform to the pressure pad during the pressing operation. In this way the thrust exerted against the charger by the friction of the tobacco inside of the same as the plunger descends is rigidly supported.

From the foregoing it will be apparent that means are provided for supporting the charger independently of the hogshead in such a manner that the weight of the charger and contents is transmitted to the scale platform during the weighing operation while the thrust exerted on the charger is sustained by the rigid pressure pad during the pressing operation.

Referring now to Figs. 9, 10, 11 and 12, the connection between the lower end of the charger and hogshead will now be described. As already mentioned I provide at the lower end of the charger an expansible funnel device adapted to enter the upper end of the hogshead. This expansible funnel consists of a circular series of relatively thin overlapping metal plates 61 supported by a ring 59 secured to a circular flange 11ᵃ carried by the lower end of the charger 11. The ring 59 has a depending circular flange into which is set a series of pairs of pins or studs 60 (see Fig. 12). Each of the plates 61 is provided at its upper edge with a pair of holes 62 adapted to slip freely over these pins.

Each plate 61 has a relatively narrow plate 64 secured thereto and a triangular web 63 connecting the plates 61 and 64. A guard ring 65 is secured to the lower surface of the ring 59 to prevent accidental disengagement of the plate 61 from the pins 60.

In assembling the plates 61 they are positioned as shown in dotted lines in Fig. 12 so that their upper edge engages behind the guard ring 65 and are then engaged over the pins 60 and swung down to full line position. Thus the plates are pivotally supported at their upper ends on the pins or studs 60.

Carried by the inner face of the ring frame 10' is a series of brackets 67 in each of which is set an adjustable stop screw 66, and these stop screws are so positioned as to engage the outer ends of the plates 64 when the charger is lowered.

When the charger is in its upper position the parts occupy the relative positions shown in full lines in Fig. 11. After the hogshead has been put in place the charger is lowered by means of the hydraulic cylinders 18, and the plates 61 move down toward the position shown in dotted lines. As they approach this position the plates 64 engage the stop pins 66 and as their downward movement continues they are swung on their pivots by the pins 66. The parts are so proportioned that just before the plates 64 engage the pins 66, the lower ends of the plates 61 enter the upper edge of the hogshead, and thereupon as the plates continue to move downwardly and are swung outwardly on their pivots as described they expand the upper edge of the hogshead into some such position as indicated in dotted lines in Fig. 11. This expansion also serves to correctly center the hogshead with respect to the charger, and the funnel device serves as a leak proof connection between the charger and hogshead to direct the tobacco into the latter without spilling or wasting the same.

The downward movement of the charger and hence the extent to which the plates 61 enter and expand the hogshead is limited by engagement of the brackets 12 with the stop screws 14. After the brackets 12 engage these screws and after the filling operation is complete and the dolly tracks 34 are lowered into the position shown in Fig. 7, there is a slight further downward movement of the entire structure including the columns 8 and tie bars 9, until the latter engage the stop screws 47, shown in Fig. 6. By adjusting these screws into proper relationship with the stop screws 14, the extent of this further downward movement may be made very small, and, in any event, it may be so regulated as to avoid damaging the hogshead.

What I claim is:

1. In a press for packing tobacco in hogheads, the combination with means for supporting a hogshead to be packed, a charger, means for raising and lowering said charger, means independent of the hogshead and of said raising and lowering means for supporting said charger above the hogshead, and a press plunger operating within said charger.

2. In a press for packing tobacco in hogsheads, the combination of a dolly for supporting a hogshead to be packed, tracks for the wheels of said dolly, means for supporting said tracks, a charger, means independent of the hogshead and including said tracks for supporting said charger above the hogshead, and additional means for moving said charger vertically relative to said tracks to permit the hogshead and dolly to be rolled into position beneath said charger.

3. In a press for packing tobacco in hogsheads, the combination of a dolly for supporting a hogshead to be packed, tracks for the wheels of said dolly, a charger, releasable power means for lifting said charger vertically relative to said tracks to permit the hogshead and dolly to be positioned beneath said charger, and stop means in addition to said power means and independent of said hogshead for limiting the downward movement of said charger when said lifting means is released.

4. In a press for packing tobacco in hogsheads, the combination of a dolly for supporting a hogshead to be packed, tracks for the wheels of said dolly, means for supporting said tracks, a charger, releasable power means for lifting said charger vertically relative to said tracks to permit the hogshead and dolly to be positioned beneath said charger, and stop means independent of said hogshead and rigidly supported by said tracks for arresting the downward movement of said charger when said lifting means is released.

5. In a press for packing tobacco in hogsheads, the combination of a dolly for supporting a hogshead to be packed, tracks for the wheels of said dolly, means for raising and lowering said tracks, a pressure pad disposed between said tracks, a charger, releasable power means for moving said charger upwardly relative to said tracks to permit the hogshead and dolly to be positioned beneath the charger when the tracks are raised, stop means independent of said hogshead, for limiting the downward movement of said charger when said power means is released, and means whereby, when said tracks are lowered, both the weight of the hogshead and of said charger are supported by said pressure pad.

6. In a press for packing tobacco in hogsheads, the combination of a dolly for supporting a hogshead to be packed, tracks for the wheels of said dolly, means for raising and lowering said tracks, a pressure pad disposed between said tracks, a charger, releasable power means for moving said charger upwardly relative to said tracks to permit the hogshead and dolly to be positioned beneath the charger when the tracks are raised, stop means independent of said hogshead and supported by said tracks for arresting the movement of said charger by gravity toward said hogshead when said power means is released, and means carried by said pressure pad for limiting the the downward movement of said stop means when said tracks are lowered.

7. In a press for packing tobacco in hogsheads, the combination with a charger for delivering tobacco into the hogsheads, a press plunger movable into and out of said charger, means for feeding tobacco into the upper end of said charger, a weighing scale having a platform located beneath said press plunger, sustaining means on which said charger rests independent of said hogshead, means by which the hogshead and charger and the mass of tobacco in both the hogshead and charger are supported entirely on said platform during the filling operation, and means by which the hogshead, charger and mass of tobacco are supported independently of said platform during the pressing operation.

8. In a press for packing tobacco in hogsheads, the combination with a downwardly operating press plunger, of a weighing scale having a platform located beneath said press plunger, a dolly on which the hogshead to be packed is carried, tracks for the wheels of said dolly, power means interposed between said tracks and scale platform by which said tracks are raised and lowered and by which they are supported on said scale platform while the hogshead is being filled, a pressure pad located between said tracks, and means whereby, when said tracks are lowered, the weight of the hogshead and dolly is transferred from said scale platform to said pad, and the thrust of said plunger suported by said pad independently of the wheels of said dolly during the pressing operation.

9. In a press for packing tobacco in hogsheads, the combination with a downwardly operating press plunger, of a weighing scale having a platform located beneath said press plunger, a dolly on which the hogshead to be packed is carried, tracks for the wheels of said dolly, means including fluid pressure cylinders mounted on said scale platform for supporting said tracks while the hogshead is being filled, a rigid pressure pad located between said tracks, and means for controlling said cylinders in such manner that said tracks may be lowered and the dolly and hogshead thus transferred from said tracks to said pressure pad, whereby the thrust of said plunger is supported independently of said scale platform during the pressing operation.

10. In a press for packing tobacco in hogsheads, the combination with a vertically disposed double acting main hydraulic cylinder, of a downwardly acting press plunger operated thereby, a dolly on which the hogshead to be packed is carried, tracks for the wheels of said dolly, means including single acting auxiliary hydraulic cylinders for raising and lowering said tracks, a rigid pressure pad located between said tracks, fluid conduit means connecting said auxiliary cylinders with the lower end of said main cylinder, whereby, when fluid is supplied to the lower end of said main cylinder, so that said plunger is up, during the filling operation, fluid is also supplied to said auxiliary cylinders to raise said tracks so that they support the dolly, and when fluid is exhausted from the lower end of said main cylinder and the said plunger moves down for the pressing operation, fluid is also exhausted from said auxiliary cylinders and said tracks thus lowered until said dolly rests upon said pressure pad, so that the thrust of said plunger is sustained by said pad independently of the wheels of said dolly.

11. Apparatus for packing tobacco in hogsheads comprising a charger, means beneath said charger for supporting a hogshead in such manner that its upper portion is free to move laterally, means independent of the hogshead for sustaining said charger, and means for raising and lowering the same, said charger having at its lower end tapering funnel means adapted to enter the upper end of said hogshead as the charger is lowered, to true and center the same.

12. Apparatus for packing tobacco in hogsheads comprising a charger, means independent of the hogshead for supporting said charger, said charger having at its lower end expansible funnel means constructed to enter the upper end of the hogshead, said funnel means comprising a circular series of plates, pivotally supported at their upper ends, and means operated by the downward movement of said charger for swinging said plates simultaneously outwardly after their lower ends have entered the top of the hogshead, said plates in all positions being disposed in laterally overlapping relation so as to provide a peripherously continuous and leak proof wall.

13. Apparatus for packing tobacco in hogsheads comprising a charger, means for raising and lowering the same, said charger having at its lower end tapering funnel means adapted to enter the upper end of said hogshead as the charger is lowered, and means independent of said hogshead and of said raising and lowering means for limiting the extent to which said funnel enters the hogshead.

14. Apparatus for packing tobacco in cylindrical, substantially rigid upstanding containers, comprising a vertically movable charger, means independent of the container for sustaining said charger, a wheeled dolly for transporting said container to and supporting it in a location beneath said charger in generally upright position, and means carried by said charger for engaging the upper edge of said container to accurately align it with said charger as the latter moves downwardly.

15. Apparatus for packing tobacco in cylindrical, substantially rigid upstanding containers, comprising a vertically movable charger, means independent of the container for sustaining said charger, a wheeled dolly for transporting said container to and supporting it in a location beneath said charger in generally upright position, and tapering funnel means at the lower end of said charger adapted to enter the upper rim of the container to accurately center and align it with said charger as the latter moves downwardly.

References Cited in the file of this patent

UNITED STATES PATENTS

| Number | Name | Date |
|---|---|---|
| 803,357 | Peile et al. | Oct. 31, 1905 |
| 861,007 | Wilhelm | July 23, 1907 |
| 1,088,633 | Simmons et al. | Feb. 24, 1914 |
| 2,579,176 | Dalton | Dec. 18, 1951 |
| 2,605,697 | Beil et al. | Aug. 5, 1952 |
| 2,619,272 | Boehling | Nov. 25, 1952 |
| 2,675,154 | Fishburne | Apr. 13, 1954 |